(No Model.) 4 Sheets—Sheet 1.

T. J. HOGAN.
AIR BRAKE.

No. 551,440. Patented Dec. 17, 1895.

WITNESSES:
Chas. F. Miller.
J. E. Gaither.

INVENTOR,
Thomas J. Hogan.

(No Model.)

4 Sheets—Sheet 2.

T. J. HOGAN.
AIR BRAKE.

No. 551,440.

Patented Dec. 17, 1895.

WITNESSES:
Chas. F. Miller
G. E. Gaither

INVENTOR,
Thomas J. Hogan

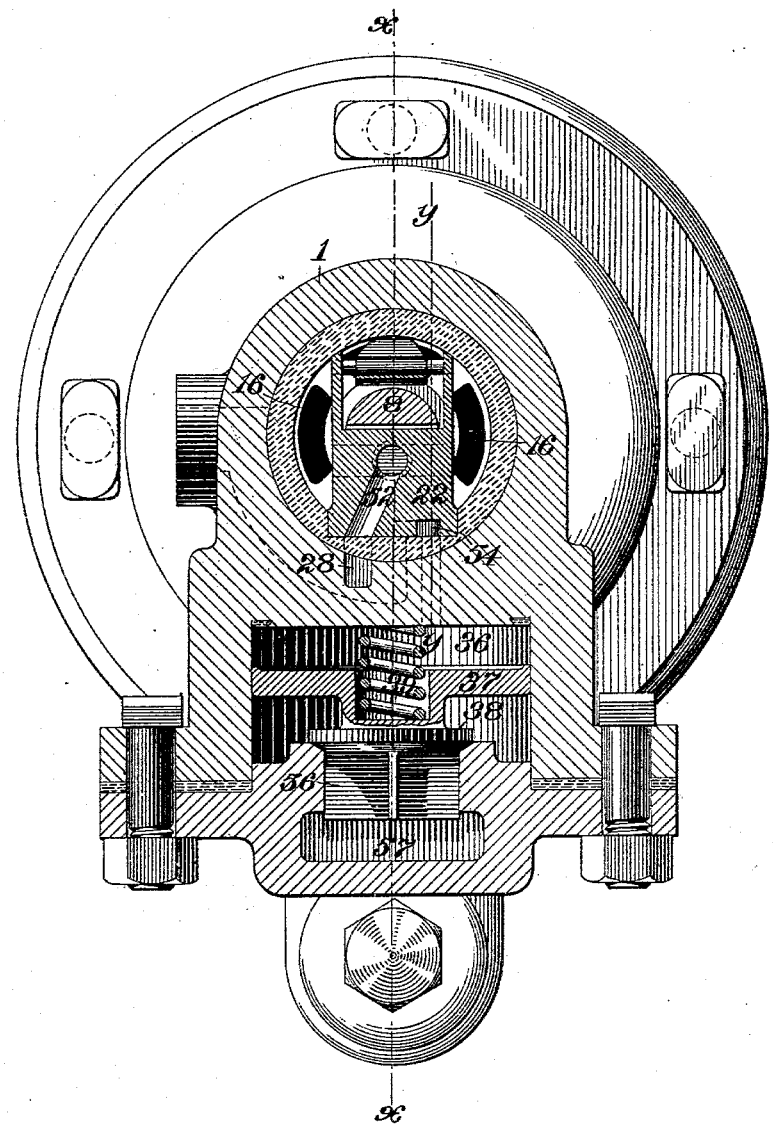

(No Model.) 4 Sheets—Sheet 4.
T. J. HOGAN.
AIR BRAKE.
No. 551,440. Patented Dec. 17, 1895.
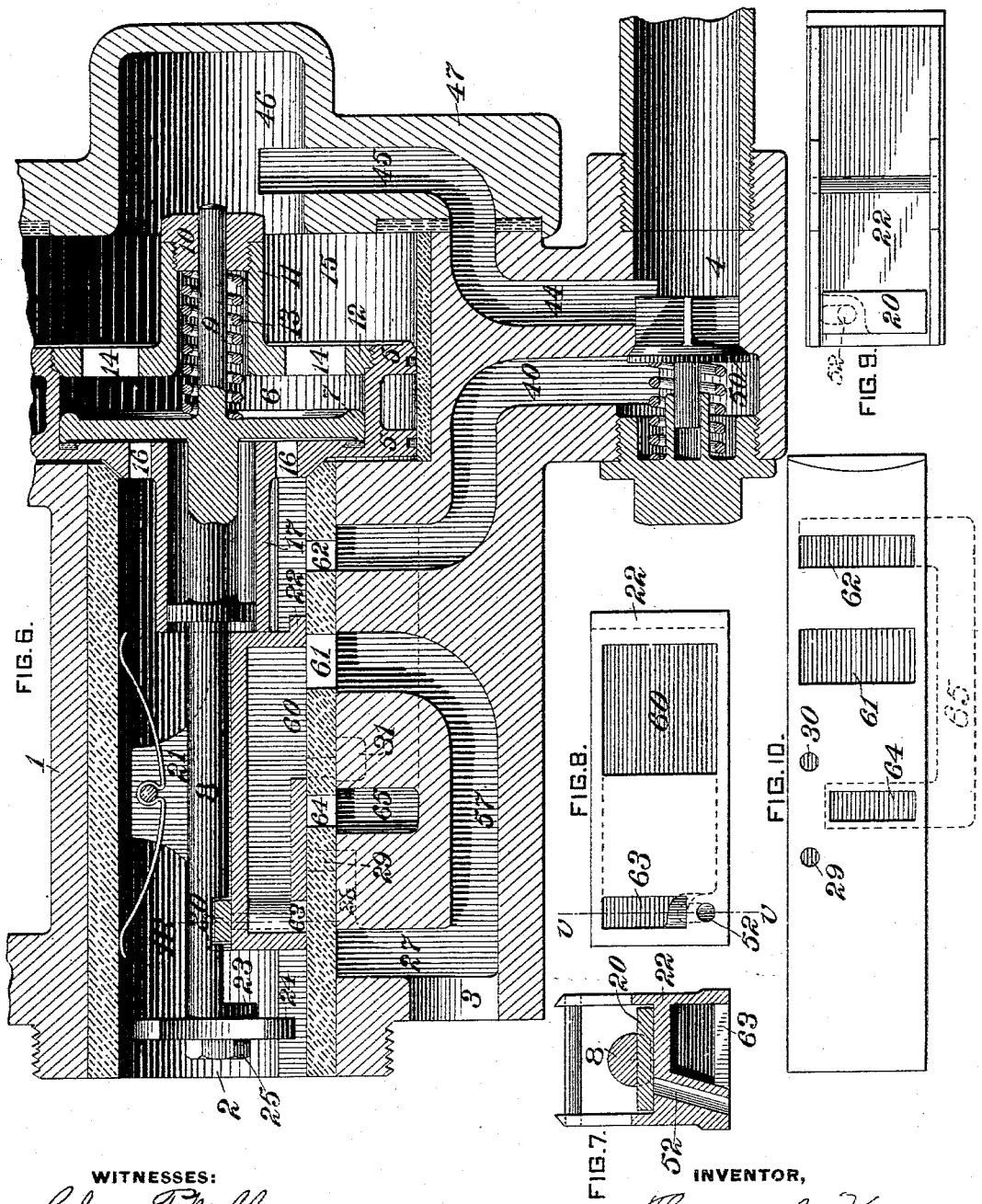
WITNESSES:
Chas. F. Miller
F. E. Gaither
INVENTOR,
Thomas J. Hogan.

UNITED STATES PATENT OFFICE.

THOMAS J. HOGAN, OF PITTSBURG, ASSIGNOR TO THE WESTINGHOUSE AIR BRAKE COMPANY, OF WILMERDING, PENNSYLVANIA.

AIR-BRAKE.

SPECIFICATION forming part of Letters Patent No. 551,440, dated December 17, 1895.

Application filed November 15, 1894. Serial No. 528,847. (No model.)

*To all whom it may concern:*

Be it known that I, THOMAS J. HOGAN, a citizen of the United States, residing at Pittsburg, in the county of Allegheny and State of Pennsylvania, have invented or discovered a certain new and useful Improvement in Air-Brakes, of which improvement the following is a specification.

The object of my invention is to provide an improvement in automatic fluid-pressure-brake apparatus; and to this end it consists in new and improved means for locally venting the train-pipe for the purpose of effecting a quick and simultaneous application of the brakes on all the cars of a train.

Figure 1:
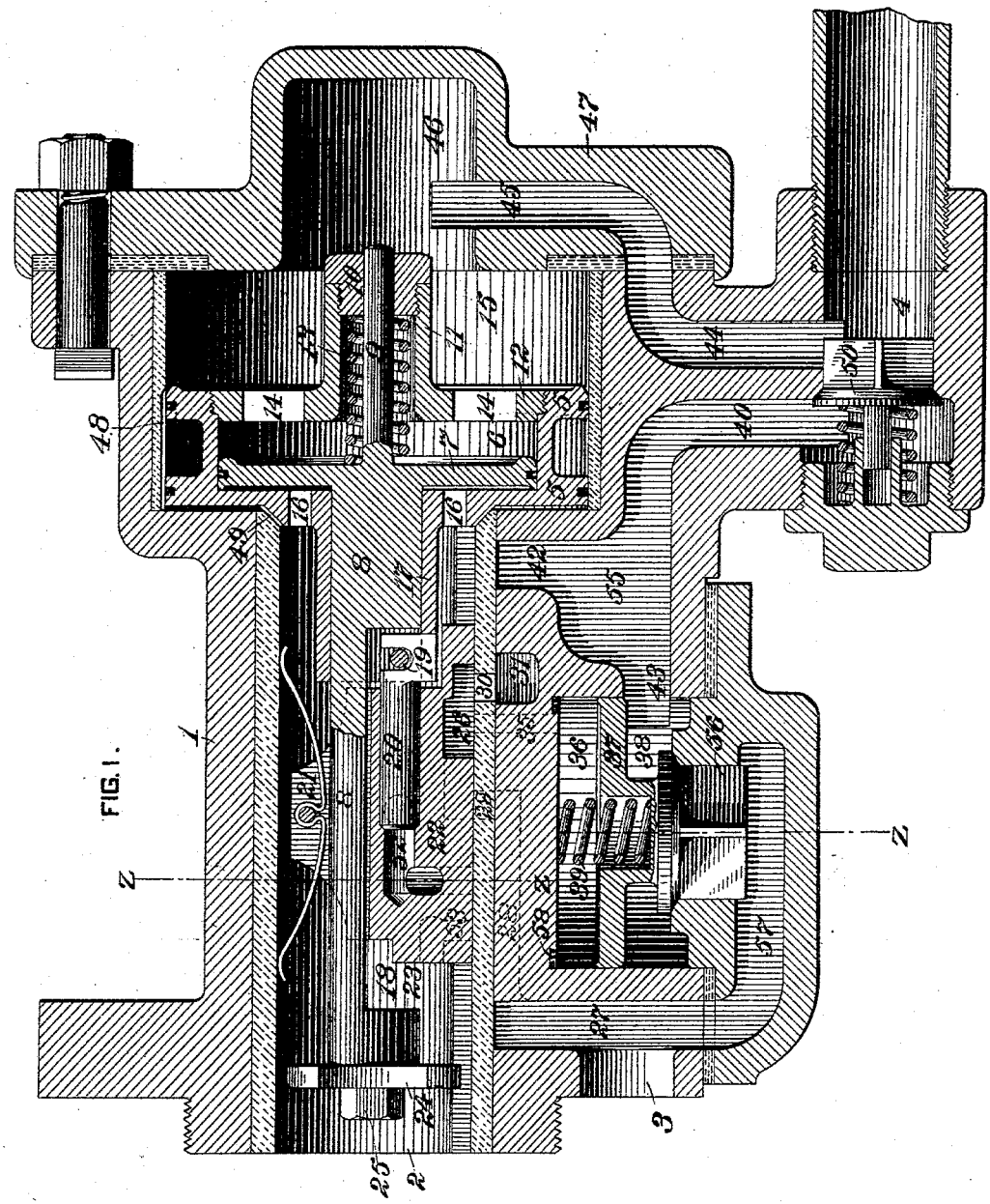
Figure 2:
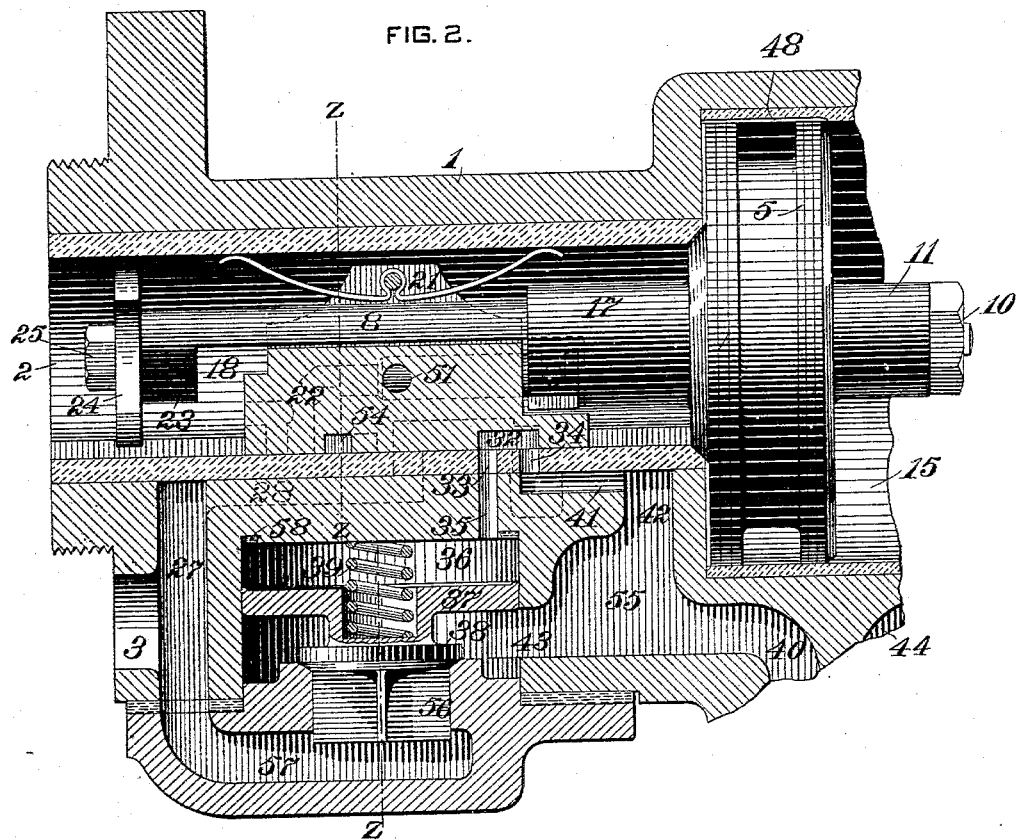
Figure 4:
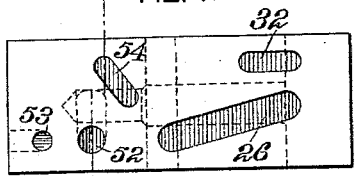
Figure 5:
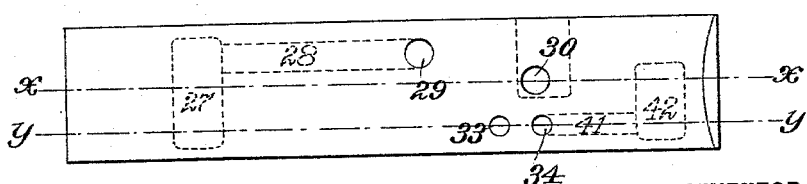

In the accompanying drawings, which illustrate an application of my invention, Figure 1 is a vertical longitudinal section on the line *x x* of Figs. 3 and 5 through a triple-valve device constructed in accordance with my invention. Fig. 2 is a similar section through the main valve and its seat on the line *y y* of Fig. 3, but that portion of Fig. 2 below the top of the piston-chamber 36 is a section on the line *x x* of Fig. 3; Fig. 3, a vertical transverse section on the line *z z* of Figs. 1 and 2; Fig. 4, a view showing the face of the main valve of Figs. 1, 2, and 3; Fig. 5, a plan view of the seat of the main valve shown in Figs. 1, 2, and 3; Fig. 6, a vertical longitudinal section through a triple-valve device, showing a modification in which the main valve of the triple-valve device directly controls the local release of fluid from the train-pipe; Fig. 7, a transverse section on the line *v v* of Figs. 6 and 8 of the main and graduating valves; Fig. 8, a view of the face of the main valve shown in Fig. 6; Fig. 9, a plan view of the main and graduating valves shown in Figs. 6, and Fig. 10 a plan view of the seat of the main valve shown in Fig. 6.

The casing 1 of the triple-valve device shown in Figs. 1, 2, 3, 4, and 5 is provided with an opening or passage 2, which is always in open communication with the auxiliary reservoir, a passage 3, which communicates with the brake-cylinder, and a passage 4, which connects directly with the main train-pipe or with a branch therefrom.

As shown in the drawings, the triple-valve piston 5 is provided with a chamber 6, which contains a supplemental piston 7, having a stem 8 on one side extending into the main-valve chamber 18 and a stem 9 on the other side passing through a guide-nut 10. The guide-nut 10 is screwed into an extension 11 formed on a perforated plate 12, which is secured to the triple-valve piston 5, and forms a stop to limit the travel of the piston 7. The extension 11 is made hollow so as to form a pocket for the spring 13, which surrounds the stem 9, and bears at one end against the guide-nut 10 and at the other end against the piston 7.

The piston 7 is at all times exposed on one side to train-pipe pressure, the chamber 6 being in open communication with the chamber 15 and the train-pipe through the openings 14, and on its other side the piston 7 is exposed to auxiliary-reservoir pressure which has access thereto through the openings 16.

The resistance of the spring 13 is such as to prevent any movement of the piston 7 relative to the piston 5 in making service applications of the brakes; but when a sufficiently great and rapid reduction of train-pipe pressure is effected the auxiliary-reservoir pressure acting on the piston 7 will move it to the right against the resistance of the spring until the piston 7 abuts against the plate 12.

The main piston 5 is provided with a tubular stem 17, which projects into the main-valve chamber 18, and, as shown in Figs. 1 and 2, is connected by means of a pin 19 with a graduating-valve 20. The stem 8 of the piston 7 passes through the tubular stem 17 and between the wings 21 of the main slide-valve 22, and is provided near its end with a shoulder 23, which is adapted to abut against the end of the valve 22 when the stem is moved to the right. A guide 24 is secured to the stem 8 by means of a nut 25.

When the parts are in the positions shown in the drawings, the main valve is in position to release the brakes. The brake-cylinder port 3 of Figs. 1 and 2 is connected through the passages 27 28, port 29, and the cavity 26 in valve 22 with the port 30, which opens into the exhaust-passage 31 leading to the atmosphere. At the same time a cavity 32 in the main valve connects the ports 33 and 34 in the seat of the main valve. The port 33 is connected by a passage 35 with the upper end of a chamber 36, containing a piston or movable abutment 37, which is operatively connected to a valve 38. The port 34 is connected by means of a passage 41 with a branch passage 42, which is in open communication with the under side of the piston 37 through the port 43, and which is also in open communication with the passage 40 leading from the train-pipe.

With the construction shown in Figs. 1 to 5, when the brake system is charged with fluid under pressure, fluid from the train-pipe flows through the passages 4, 44, and 45 into the chamber 46 in the cap 47 and into the piston-chamber 15, and moves the piston 5 into the position shown in the drawings. The end of feed-groove 48 is then uncovered by the piston 5, and the fluid from the train-pipe passes through the feed-groove 48, around the piston, and through the groove 49 into the chamber 18, which is in open communication with the auxiliary reservoir. At the same time fluid from the train-pipe lifts the check-valve 50 and flows through the passage 40 and port 43 into the space 55 and chamber 36 below the piston 37, and through the passages 42, 41, port 34, cavity 32, port 33, and passage 35 into the chamber 36 above the piston 37. The piston 37 is held in its normal position with the valve 38 closed by means of the excess of fluid-pressure on its upper side due to the greater effective area of the upper side of the piston, the effective area of the lower side of the piston being less than that of the upper side by the area of the valve 38. In addition to this difference in fluid-pressure I employ a spring 39, which tends to hold the valve to its seat.

In making service applications of the brakes a gradual and comparatively light reduction of train-pipe pressure will move the piston 5 to the right without shifting the position of the piston 7 relative to the piston 5. The first effect of this movement will be to unseat the graduating-valve 20 so as to open a passage for fluid from the auxiliary reservoir to flow through the side port 51 into the passage 52, and as the piston continues to move to the right the lost motion between the end of the valve 22 and the shoulder 23 on the stem 8 is taken up. The shoulder 23 then abuts against the end of the valve 22 and moves the valve to the right until the piston 5 has reached the end of its stroke. The first part of the movement of the valve 22 will close the port 29, thereby closing communication from the brake-cylinder to the atmosphere, and the further movement of the valve will cause the passage 52 to register with the port 29, and fluid from the auxiliary reservoir will flow through the passages 51 and 52, port 29, and passages 28, 27, and 3 to the brake-cylinder. Unless the reduction of train-pipe pressure is continuous, the reduction of auxiliary-reservoir pressure, caused by the flow into the brake-cylinder, will permit the train-pipe pressure to move the piston 5 back again to the left far enough to close the graduating-valve 20 without moving the slide-valve, and the flow from the auxiliary reservoir to the brake-cylinder will be cut off.

If it is desired to admit a greater quantity of fluid to the brake-cylinder, a further reduction of train-pipe pressure will cause the piston 5 to be moved again to the right to the limit of its stroke so as to open the graduating-valve, and it will close again when the auxiliary-reservoir pressure is again reduced slightly below the pressure in the train-pipe. This may be repeated as often as desired, and if preferred a continuous reduction of train-pipe pressure may be made so as to hold the graduating-valve open until a full-service application of the brakes is effected.

When it is desired to make an emergency application of the brakes a greater and more rapid reduction of train-pipe pressure is necessary, so that the difference of pressures on the opposite sides of the piston 7 will permit the auxiliary-reservoir pressure, acting on one side of the piston 7, to move the piston 7 against the train-pipe pressure and the pressure of the spring 13 acting on the other side of the piston. When such a reduction of train-pipe pressure is made the piston 7 moves the full length of its stroke to the right until it bears against the plate 12, and thereby takes up the greater portion of the lost motion between the end of the valve 22 and the shoulder 23 on the stem 8. At the same time, or it may be a little later or a little earlier, the piston 5 moves to the right the full length of its stroke, as in making service applications. The slide-valve 22 is moved so that the exhaust-port 30 is cut off from the brake-cylinder, the port 53 registers with the port 29, the port 34 is closed, and the cavity 54 in the slide-valve connects the ports 33 and 30 in the valve-seat. The fluid in the chamber 36 above the piston 37 then flows through the passage 35, port 33, cavity 54, port 30, and passage 31 to the atmosphere, thereby relieving the pressure above piston 37, and permitting the pressure below the piston 37 to compress the spring 39 and lift the valve 38 from its seat. The fluid under pressure in the space 55 and passage 40 will then flow through the passages 56 57 and port 3 to the brake-cylinder, and the pressure on the back of the check-valve 50 being relieved the train-pipe pressure will open the check-valve and flow through the passage 40, port 43, chamber 36, and passages 56 57, and port 3 to the brake-cylinder until the pressure in the brake-cylinder is sufficiently high to close the check-valve 50. At the same time fluid under pressure will flow from the auxiliary reservoir through the ports 53 and 29 to the brake-cylinder until the pressures in the auxiliary reservoir and brake-cylinder are equalized.

When the piston 37 is moved upward, it seats on the gasket 58 and makes a tight joint, which prevents leakage from the brake-cylinder to the atmosphere.

It will be seen that with my improvement the triple-valve piston has the same length of traverse to the right for both service and emergency applications, and that the main valve has a greater traverse for emergency applications than for service applications, and the additional traverse of the valve is effected by and is equal to the traverse of the piston 7 relative to the piston 5.

In the construction shown in Figs. 6, 7, 8, 9, and 10, I have shown a main slide-valve 22 which is so constructed that when it is moved into the emergency position by the piston 7 it will directly connect the passages leading from the train-pipe with the brake-cylinder passage. In this construction the graduating-valve 20, which is a slide-valve mounted on the back of the main valve, controls a port 52 extending through the main valve, and is connected to the stem 8 of the piston 7 by fitting in a notch or groove in the under side of the stem 8.

The seat of the main valve is provided with a port 29, which is normally closed at its upper end by the main valve, and which communicates at its lower end with the brake-cylinder through the passages 28, 27, and 3. A port 30 in the main valve-seat opens at its lower end into the exhaust-passage 31, which leads to the atmosphere, and when the main valve is in the release position, as shown in Fig. 6, the upper end of the port 30 is connected, by the opening 60 in the main valve, with a port 61 in the valve-seat. The port 61 is in communication with the brake-cylinder through the passages 3 and 57, and when the main valve is in release position the brake-cylinder fluid is released to the atmosphere through the passages 3, 57, 61, 60, 30, and 31.

In making a service application of the brakes, the piston 5 moves the full length of its stroke to the right, and the piston 7 moves with it but has no movement relative to the piston 5. The graduating-valve 20 uncovers the port 52 in the main valve. The shoulder 23 on the stem 8 abuts against the end of the main valve and moves it far enough to cause the exhaust-port 30 in the valve-seat to be closed and the passage 52 in the main valve to register with the port 29 in the valve-seat. Fluid from the auxiliary reservoir will then flow through the passage 52, port 29, and passages 28, 27, and 3 to the brake-cylinder.

When the auxiliary-reservoir pressure is reduced a little below the train-pipe pressure by the flow into the brake-cylinder, the two pistons and the graduating-valve are moved back to the left until the end of the hollow stem 17 abuts against the end of the main valve, when further movement to the left will be stopped and the flow from the auxiliary reservoir to the brake-cylinder will be cut off by the graduating-valve 20, which then covers the port or passage 52.

When a suitable reduction of pressure is made to cause an emergency application of the brakes, the main piston 5 is moved to the right the full length of its stroke, as in service applications, and the piston 7 is moved relatively to the main piston the full length of its stroke to the right in the chamber 6. The shoulder 23 on the stem 8 abuts against the end of the main valve and moves it to the right far enough to cause the opening 60 in the main valve to connect the port 62 with the port 61, and at the same time to cause the port 63 in the face of the main valve to register with the port 64 in the valve-seat. The port 62 opens directly into the passage 40; and the port 64 is connected with the passage 40 by means of a side passage 65, (shown in Figs. 6 and 10,) so that when the ports 62 and 64 are put in communication with the port 61 fluid under pressure from the train-pipe lifts the check-valve 50 and flows through the passage 40, port 62, passage 65, ports 64 and 63 and through the main valve into the port 61 and passages 57 and 3 to the brake-cylinder. At the same time the port 29 is uncovered by the end of the main valve, and fluid under pressure flows from the auxiliary reservoir through port 29, passages 28, 27, and 3 to the brake-cylinder.

I claim as my invention and desire to secure by Letters Patent—

1. In an automatic fluid pressure brake system, the combination, in a triple valve device, of a main valve, a piston for operating the main valve, and a supplemental piston for moving the main valve into position for making an emergency application of the brakes, substantially as set forth.

2. In an automatic fluid pressure brake system, the combination, in a triple valve device, of a main valve, a piston for operating the main valve which has the same traverse in both service and emergency applications of the brakes, and means for moving the main valve into position to effect an emergency application of the brakes either simultaneously with the movement of the main piston or after the main piston has completed its stroke, substantially as set forth.

3. The combination, in a triple valve device, of a main valve, a main piston, a stem by which the piston is operatively connected to the valve so as to effect a service application of the brakes by a full stroke of the piston, and means for varying the adjustment of the stem relative to the piston so as to effect an emergency application of the brakes by the same movement of the piston, substantially as set forth.

In testimony whereof I have hereunto set my hand.

THOMAS J. HOGAN.

Witnesses:
CHAS. F. MILLER,
F. E. GAITHER.